June 23, 1964 G. F. AROYAN 3,138,712
PHOTOSENSITIVE ENERGY DETECTION SYSTEM
Filed Aug. 5, 1959 5 Sheets-Sheet 2

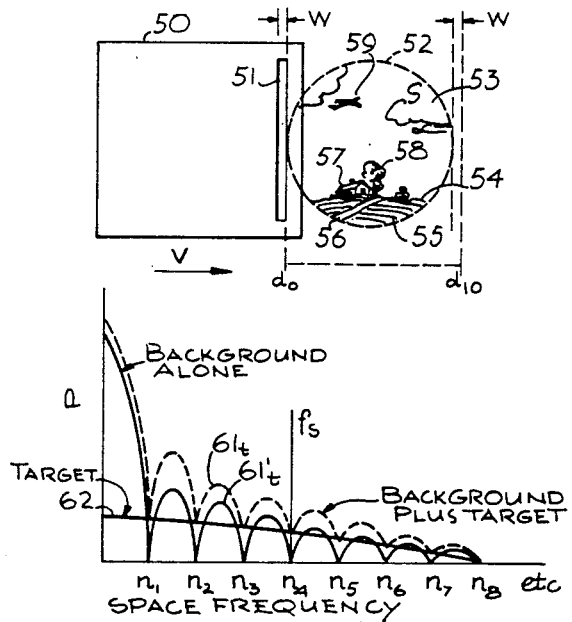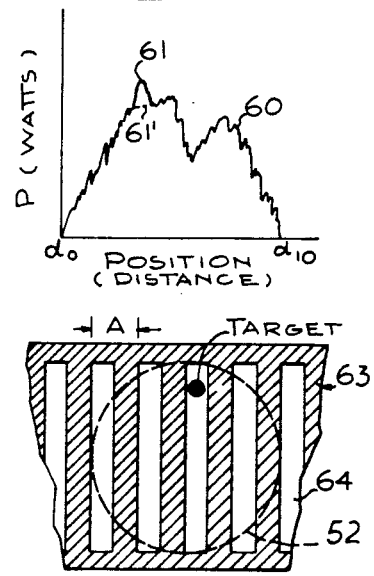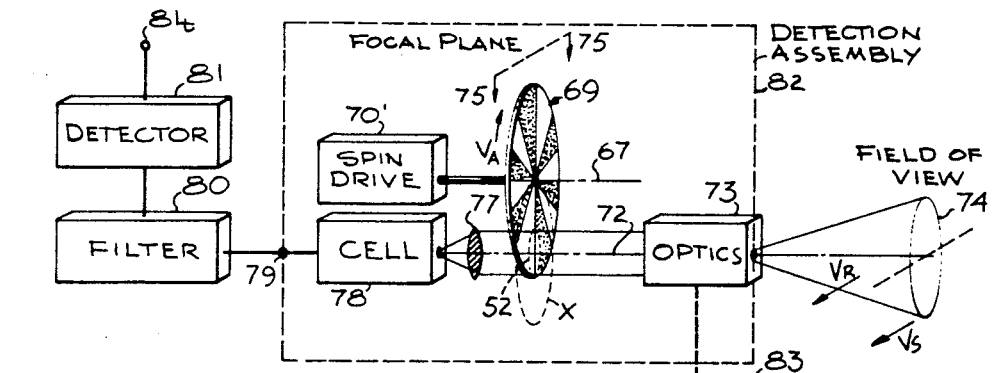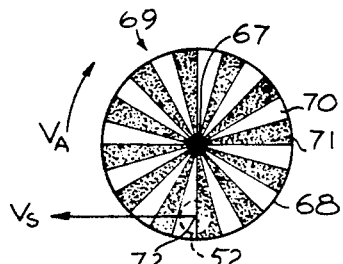

GEORGE F. AROYAN
INVENTOR.

BY
ATTORNEY

TRANSFORM OF ECCENTRIC APERTURE FUNCTIONS

United States Patent Office 3,138,712
Patented June 23, 1964

3,138,712
PHOTOSENSITIVE ENERGY DETECTION SYSTEM
George F. Aroyan, Manhattan Beach, Calif., assignor, by mesne assignments, to The Bunker-Ramo Corporation, Canoga Park, Calif., a corporation of Maryland
Filed Aug. 5, 1959, Ser. No. 831,908
9 Claims. (Cl. 250—203)

This invention relates to improved optical systems for detecting point targets, i.e., effectively point sources or reflectors of radiant energy, and more particularly to low noise chopping reticles for use in such systems.

In the prior art, numerous systems have been disclosed for detecting and determining the position of bodies from which is emanated some form of detectable energy such as light, heat, or radio frequency waves. A number of these prior art systems have provided considerable sensitivity and accuracy in their operation. However, especially in the field of visible or infrared target detection, there exists considerable need for improving the sensitivity and response speed of such systems so as to afford more suitable apparatus, by way of example, for detecting or tracking moving bodies or targets such as modern supersonic aircraft and missiles.

Furthermore, there exists a strong need for improving the ability of such detection systems to discriminate between objects representing targets of interest and other objects in the vicinity of such targets which constitute troublesome sources of background "noise" information.

As will appear hereinafter, although the present invention finds particularly useful application to detection systems responsive to infrared radiation, the novel features thereof are also of advantage in radiant energy detection systems based upon the detection of radio waves and visible and invisible light rays. To this end the term "optical," often employed as descriptive of visible light processing systems, will, as used in this specification, be construed as being also descriptive of systems for collecting, directing, refracting, transducing and detecting radiant energy other than that constituting visible light. Likewise, where hereinafter examples of operating principles underlying the prior art and the improvements thereover offered by the present invention may be given in terms of a specific form of radiant energy, such as infrared, such principles will be understood to have potential usefulness in systems responsive to certain other specific forms of radiant energy.

In most prior art optical systems employed for detecting and determining the position of a target, the space in which it is suspected that an energy emanating target may be present is systematically examined by an optical type energy collection apparatus. The energy collection apparatus, generally employing combinations of mirrors and/or lenses, is designed to be responsive on a selective basis to only that energy which is collected within a given angular field of view so that the collection apparatus may be regarded as having a responsive pattern generally representable as a solid cone extending into space, with the apex of the cone positioned at a given point of observation. This angular field of view, or response pattern, is generally referred to as the "instantaneous field of view" or sometimes "field of view" of the collection apparatus and is defined by the size of the "field stop" characterizing the collection apparatus itself. The "field stop" size of such collection apparatus is generally determined either by a diaphragm restriction in the optical path within the apparatus or by inherent characteristics of the lenses or mirrors used. The optical axis of the collection apparatus, as projected into space, is in most cases centrally disposed within this instantaneous field of view so that the optical axis of the energy collection system is in geometric coincidence with the axis of the conical response pattern of the apparatus. The energy collected within the instantaneous field of view is directed to an energy sensitive cell which develops an electrical potential or signal, the magnitude of which represents the intensity of the total radiant energy collected within the field of view which includes energy, such as may fall in the infrared spectrum, emanating from the target per se as well as background radiation such as sky, clouds, water, etc., against which the target may appear.

However, in accordance with the prior art technique, it is common to find that a circular disc-like chopping reticle is positioned within the energy collection apparatus at an image or focal plane thereof. Such a reticle is rotated about its axis in interrupting relation to radiation collected by the apparatus to "chop" the radiation as it is directed to the sensitive cell. This type of reticle is generally called a "chopping" reticle because it is comprised of a pattern of carefully dimensioned alternating areas of relative opacity and transmissivity to the energy collected by the apparatus. These areas often have the shape of sectors of a circle. The areas of transmissivity, defined between any two areas of relative opacity on the reticle, are sometimes called "reticle apertures." It has been the practice to align the rotational axis of the reticle with the optical axis of the collection apparatus, at an image plane therein, so as to focus or image the field of view on the reticle. The field of view, as imaged on the reticle, is generally circular in shape and is defined in size by the aforementioned field stop of the apparatus. The diameter of the reticle has in the past been made large enough to embrace the entire imaged field of view to thus interfere with all energy or radiant energy power reaching the cell.

In prior art systems, incorporating such chopping reticles, the reticle is rotated about its axis at a selected angular velocity. As it rotates, the reticle apertures move within the imaged field of view and modulate the energy reaching the energy sensitive cell. The cell then produces an output signal having a direct-current component proportional to the average illumination thereof and generally a plurality of alternating-current harmonically related modulation components, the largest and fundamental alternating-current component having a frequency termed the "chopping frequency" of the reticle. This fundamental alternating current component is sometimes called the "carrier" component of the cell's output signal. The magnitude or percentage modulation imposed on energy radiated from targets or objects in the imaged field of view by such a reticle, and hence the amplitude of the corresponding fundamental alternating-current signal or carrier produced by the cell, will be a maximum only for targets whose images on the reticle have the same order of dimension as the reticle apertures themselves as taken in the direction of reticle aperture motion. Only a relatively small portion of the energy radiating from larger objects will be modulated by the reticle chopping action.

Due to the fact that energy radiating from targets of less than a predetermined size are modulated to a greater extent than larger ones, a chopping reticle and cell combination thus effectively discriminate against targets of larger sizes in favor of those smaller than a certain predetermined size. In other words, it exhibits a certain size selectivity just as an electrical filter exhibits a certain time-frequency selectivity. Analogously then, the object size discriminating effect of a chopping reticle is sometimes called "space filtering" because the maximum contribution to the fundamental alternating-current component of the cell outpu-signal is restricted, by a chopping reticle, to energy emanating from objects or targets of less than a predetermined size. To achieve a maximum detection distance or range in such a target detecting system, it is sometimes desirable to make the width of the reticle aperture substantially equal to the blur circle of the optical system. The "blur" circle of the optical system is the minimum size to which any size target can be focused or resolved on the reticle due to inherent aberrations and distortions in the mirror and lens elements of the optical system. Under such practical conditions then, the reticle and cell combination tends to provide an overall detection action yielding maximum carrier generation only for objects whose image sizes are substantially the same as the blur circle of the energy collection apparatus.

In practice, target "surveillance," that is the detection of, position determination of, and the following of a given moving target with apparatus employing a chopping reticle is accomplished in two steps, usually termed "search" and "track," respectively. First, in search the entire collection apparatus is mechanically driven to execute a systematic scanning action which results in the exploratory examination of a volume of space which is many times greater than the instantaneous field of view subtended by the collection apparatus and in which volume of space it is suspected that an energy radiating target may be present. The output of the energy sensitive cell is oftentimes recorded or stored, on a memory basis, as the search action proceeds, so that during or after completion of the search cycle the apparatus may be automatically returned to one or more selected positions corresponding to the orientations of the apparatus, at those specific instances within the period of the searching cycle, at which target energy has been detected. After redirection of the apparatus so that its field of view embraces that general volume in space in which a specific target has been detected, the second or "track" step of the position determining process is initiated, namely that of determining the position of the target with respect to the optical axis of the energy collection apparatus. This determination has in some instances been carried out by causing the optical axis of the collection apparatus to cyclically move or "nutate" around a circular path in space which embraces the target.

More specifically, during nutation, the optical axis of the energy collection system, as projected into space, is moved around a closed loop or path defined on a spherical surface in space. This path is so positioned and restricted in size as to afford pick-up of energy from target during the movement of the instantaneous field of view. When such is the case, a frequency modulation will be imposed on the carrier component of cell's output signal. By comparing the phase of this frequency modulation with a reference signal having a phase representing the instantaneous position of the optical axis (with respect to a point on a reference line in space) as it is nutated, the polar angle coordinate of the target may be ascertained. Similarly, the magnitude of the frequency modulation imposed on this carrier component will be proportional to the polar radius coordinate of the target in the imaged field of view. From this information, a servo control system may be brought into action to track or follow any target motion.

In accomplishing the tracking phase of target surveillance, there has been recently developed an improved not too generally known form of detection apparatus which so employs a chopping reticle as to afford a more accurate and reliable tracking action than systems prior thereto. Whereas, in earlier systems the axis of the spinning chopping reticle was oriented in coincidence with the optical axis of the energy collection apparatus, in this more recently developed system, the reticle axis is effectively displaced or "offset" from the optical axis of the collection apparatus. The extent of this offset is such that the imaged field of view, in its entirety, is positioned between the reticle axis and the periphery of the reticle. If the reticle is made sufficiently large relative to the field of view, and the field of view is further positioned near the periphery of the reticle, all reticle apertures intercepting and moving across the field of view, at any given instant, will be moving in substantially the same direction. This arrangement, shown in more detail hereafter, affords significant advantages in accurately tracking a given target once it has been detected.

From the foregoing, it will be obvious that the total energy transmission, i.e., radiation flux, through the conventional center spoke-type reticle will be constant with respect to time when the radiation intensity is uniform over the entire imaged field of view of the system regardless of the position, size and shape of the opaque and transparent areas on the reticle. Although these parameters are less important in the design of a centered chopping reticle, they have become very important in the recently developed system in which the reticle axis of rotation is maintained parallel to but displaced from the optical axis of the system with which it is employed. The use of this new system has several advantages over the use of the prior art centered reticle. However, the transparent areas of an offset spoke-type reticle may intercept the imaged field of view of its associated radiant energy collection apparatus in a manner such that constant total radiant energy transmission through the spinning reticle to the sensitive cell employed therewith will not be provided even when radiation intensity is uniform over the entire imaged field of view. This is true because the sum total of all the transparent areas of the reticle in the imaged field of view may change with respect to the reticle angular position or with respect to time. This means that "aperture modulation" may be produced. This modulation must be distinguished from modultaion produced by the existence of point targets in the imaged field of view. Since, by definition, all alternating signals which are not produced by the reticle opaque areas "chopping" radiation from point targets are normally considered "noise," the above-described aperture modulation is also noise. Since any noise modulation is undesirable and measures must be taken to discriminate against any kind of it, aperture modultaion, as a separate source of noise modulation, is also undesirable.

Even though a large number of very thin transparent areas are employed and the total transparent area of an offset reticle intercepting an imaged field of view is maintained very nearly constant in terms of percent of average transparent area intercepting it throughout one complete reticle revolution, substantial aperture modulation may still be produced because it is the rate of change in energy transmission that causes aperture modulation to be produced rather than the relative or percent change in average illumination.

In accordance with the invention, the use of the offset spoke-type reticle is made still more desirable by providing a reticle made of a material presenting a plurality of areas relatively opaque to radiant energy and defining a plurality of other areas relatively transparent thereto. In this case, the reticle is movably mounted to permit the opaque areas and the transparent areas which the former define to intercept the imaged field of view periodically. Then, in accordance with the invention, the spacing of or distance between transparent areas must be substantially equal to the reciprocal of the corresponding space frequency at least at one null of the Fourier space transform of the common area defined by both a reticle aperture and the imaged field of view, which common area may vary with reticle position.

It is to be understood that the invention does at least partially eliminate aperture modulation produced by offset conventional spoke-type reticles by making at least the amplitude of the fundamental space frequency of the reticle equal to zero.

If the total area of transmissivity of a reticle intercepting an imaged field of view varies as a square wave, when it is constructed in accordance with the invention, all space harmonics are suppressed. If the total area of transmissivity does not vary in such a manner, only the fundamental space harmonic is suppressed. However, space harmonics are related to time frequency harmonics by reticle spin speed and the higher harmonics of the fundamental time frequency may be filtered out with electrical filters. What is most important is the fact that aperture modulation is zero at the fundamental space and time frequencies. Thus, the existence of point targets will not be erroneously indicated by aperture modulation of the fundamental space frequency. When a point target actually does appear in the imaged field of view, high amplitude modulation at the fundamental frequency will unambiguously indicate the existence of a target.

In the special case of total transmissivity as a square wave function of reticle position, it is possible to make all harmonics of the fundamental time or space frequency equal to zero in amplitude, as stated previously. For example, if generally longitudinal transparent areas of identical shapes are moved in a direction approximately perpendicular to their lengths across an entire imaged field of view having parallel upper and lower limits and sides parallel respectively to opposite sides of the transparent areas, then total transmissivity may be maintained constant with respect to reticle position by making both the opaque and transparent areas identical and spacing them so that an exact integral number of the opaque areas and an exact integral number of the transparent areas always fall within the imaged field of view at any instant in time.

The simplest example of this type of special case starts with the use of a rectilinear imaged field of view. When exactly parallel equal width opaque and transparent areas are moved in a direction perpendicular to their lengths and exactly in the direction of the width or length dimension of and over the entire imaged field of view, aperture modulation may be avoided by making the widths of the opaque and transparent areas such that an integral number of each always lie within the imaged field of view. Thus transmissivity of the reticle in the imaged field of view is always constant.

Other advantages of the invention will be better understood when considered in connection with the following description.

In the accompanying drawings, which are to be considered as merely illustrative:

FIG. 1 is a diagrammatic view of a reticle having one transparent area therethrough adapted to pass over a circular imaged field of view;

FIG. 2 is a graph of the radiant energy power which may pass through the transparent area during movement of the reticle shown in FIG. 1;

FIG. 3 is a graph of two Fourier transforms of portions of the curves shown in FIG. 2;

FIG. 4 is a diagrammatic view of one type of reticle which may be employed with the invention;

FIG. 5 is a plan view of a conventional spoke-type reticle on which an imaged field of view is located;

FIG. 6 is a diagrammatic view of apparatus which may be employed to practice the invention;

Figure 7:
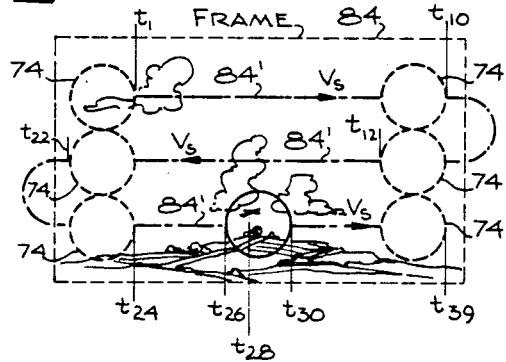
FIG. 7 is a schematic diagram of movement of an instantaneous field in a search operation which may be performed by the apparatus shown in FIG. 6.

To better understand the present invention and typical operating environments thereof, some consideration will first be given to several fundamental aspects of optical type target detection systems embodying chopping reticles.

Intensity Analysis of Optical Images

For example, in the drawing of FIG. 1, a reticle 50 having only a single rectangular slot 51 is shown disposed in a position to move horizontally across a circular imaged field of view 52 containing therein clouds 53, a horizon line 54, ground 55 having a roadway 56 thereon, buildings 57 on the horizon 54 with trees 58. Also shown by way of example in FIG. 1, within the imaged field of view 52, is a moving airplane 59.

In the instant case, it will be assumed that it is the airplane 59 which is to be detected, its position determined, and its movement tracked.

Reticle 50, shown in FIG. 1, is constructed of a sheet material relatively opaque to radiant energy. However, in the sheet, the rectangular aperture 51 of width "w" is provided which is relatively transparent to radiant energy. The total illumination power P in watts, passing through aperture 51 as reticle 50 is moved from left to right, in the direction of arrow V, over the imaged field of view 52, may be graphed as a function of the distance aperture 51 has moved from its initial rest position $d_0$. Such a graph is indicated by line 60 in FIG. 2. In FIG. 2, the rising portion 61 of solid line curve 60 is shown to indicate that portion of the function which is produced in response to the airplane 59 appearing in the imaged field of view 52, as shown in FIG. 1.

The relatively flat dotted line portion 61' of the function depicted by curve 60 is illustrated, for purposes of comparison, to indicate the appearance of the function when airplane 59 does not exist in imaged field of view 52. A comparative analysis of curve 60 inclusive of either portion 61 or 61' may be made by what is known as the Fourier transform. The symbol $d$ represents the distance aperture 51 has moved from its initial position $d_0$ shown in FIG. 1. The symbol $d_{10}$ corresponds to a position at which the aperture has completely passed through the imaged field of view 52. The distance $d_{10}-d_0=L+W$, L being the diameter of circular imaged field of view 52 and W being the width of aperture 51.

Space Frequency Description of Objects

The Fourier transform of the power distance functions shown in FIG. 2 appears substantially as shown in FIG. 3. In considering the transforms of FIG. 3, it is helpful to note that it is common practice, in electrical signal analysis, to express a power-versus-time function in terms of a power distribution of electrical signal frequencies. For example, if the time varying power demands of some electrical load circuit were to be represented by an electrical signal wave form, this signal wave form, by Fourier analysis, can be expressed or transformed into an expression depicting the power amplitude relationships between a plurality of electrical signal frequencies. That is, a power-versus-time function is transformed into an equivalent expression of power-versus-time rate of power change. By study of such a Fourier analysis or transform, it can be determined at what signal frequency or frequencies the largest amount of electrical power is represented. Likewise, in connection with the power-versus-distance functions of FIG. 2, Fourier transformation of these functions will result in an expression of power-versus-distance rate of power change. Just as the time rate of power change employed in electrical signal analysis is expressed in cycles of power change per unit time (time frequency or cycles per second), so distance rate of power change in image brightness analysis may be expressed in cycles of brightness change per unit distance (distance frequency). The concept of the frequency with which the power passing through a reticle aperture changes per unit distance of aperture displacement, gives rise to the phrase "space frequency." Thus, any image of an object may be described in terms of the amplitude and phase relation between a plurality of space frequencies. It follows then that when an imaged field of view such as indicated in FIG. 1 contains relatively small objects, such as the aircraft 59, the power-versus-space frequency description of this field of view will indicate substantial power at higher space frequencies. On the other hand, the space frequency description of a field of view of the size shown in FIG. 1 but containing only an image of blue sky would indicate relatively less power at these higher values of space frequency.

With the above in mind, the transforms $61_t$ of FIG. 3, describing the space frequency content of the field of view in the presence of a target, shows that at higher values of space frequencies a considerable amount of power is represented. Contrariwise, transform $61'_t$, describing the imaged field of view in the absence of the target 59, represents considerably less power at these higher frequencies. The difference between the transform $61_t$ and $61'_t$, of course, represents the power-versus-space frequency description of the target 59. This description is indicated by line 62. Moreover, the space frequency description of the field of view shown in FIG. 3, with, and without the target 59 present, includes the effect of the reticle aperture in scanning the finite imaged field of view as an object itself. It will be remembered that the shape of the imaged field of view is defined by the aperture characterizing the energy collection apparatus. That is, the circular imaged field of view as a whole has some value of average brightness. Thus, the reticle aperture, in passing over the imaged field of view, transmits power changes representative of an object having the size of the imaged field of view itself. This is represented in FIG. 2 by the fact at positions $d_0$ and $d_{10}$, zero energy is passed by the reticle aperture. Because of the zero intensity at positions $d_0$ and $d_{10}$ the Fourier transform of the power-versus-distance function of 61' in FIG. 2, as represented at $61'_t$ in FIG. 3 (the background alone), will have nulls $n_1, n_2 \ldots n_g$, etc. These nulls correspond to space frequencies at which the average intensity of the background, as limited or shaped by the aperture defining the circular field of view, contributes no energy.

*Re-Enforcement of Specific Values of Space Frequencies*

Turning now to FIG. 4, there is illustrated symbolically a theoretical reticle 63 comprised of an infinite number of reticle apertures 64. The apertures 64 are spaced from one another by a given distance A. If the variations in the total power passing through the reticle 63 over the entire imaged field of view is examined while the reticle is moved across the field of view, it will be found that the peak to peak amplitude of such variations will be maximum in response to substantially only those image intensity gradients or objects whose effective dimensions, in the direction in which the reticle is moved, is substantially $A/2$. This intensity change represents a periodicity of intensity change, per unit distance, of A or a space frequency of $1/A$. Thus, roughly speaking, the action of such a reticle comprising an infinite number of apertures is to reinforce a particular value of space frequency. The action of reticle 63 of FIG. 4 is, viewed from a different standpoint, discriminatory in nature. That is, the reticle tends to discriminate against all space frequencies other than $1/A$, and its harmonics.

*Target Selection by Reticle Re-enforcement*

If now, turning to the transforms of FIG. 3, the reticle spacing A of FIG. 4 is such to re-enforce a space frequency corresponding to a null or zero of the background transform $61'_t$, the presence or absence of a target, such as aircraft 59 in FIG. 1, may be quite effectively determined. Such nulls in the background transform are indicated at $n_1, n_2, n_3, n_4, n_5, n_6, n_7$, etc.—each null corresponding to a value of space frequency at which substantially no power exists or is contributed by the background content of the field of view. Thus, any power that can be measured through the reticle 52, when so dimensioned as to re-enforce a null, must be attributable to an object having dimensions comparable to that of the aircraft 59. The particular background null which the reticle 52 should be constructed to re-enforce is not critical. For a transform of the character shown in FIG. 3, however, it is expedient to choose a null defined by those portions of the curve whose slope adjacent to the null is of lesser value. Such nulls are seen to appear at higher values of space frequencies. This reduces the precision with which the reticle aperture spacing must be dimensioned to realize a substantial percentage change in the power it transmits as a function of the presence or absence of the target. However, as the transform of FIG. 3 shows, the amount of power contributed at any given value of space frequency within the field of view tends to decrease as the value of the space frequency is increased. Over-all system signal-to-noise considerations, therefore, suggest that a null be selected at some value of space frequency close to the space frequency at which expected target contributes substantial energy. As a compromise, therefore, between precision with which the reticle construction must be carried out and signal-to-noise considerations, a null such as $n_4$ in FIG. 3 is, by way of example, selected to define that space frequency which the reticle should be designed to re-enforce.

Thus, if in FIG. 4 the reticle spacing A is such to re-enforce the space frequency $f_s$ (corresponding to the null $n_4$) in FIG. 3 and the power transmitted through the reticle analyzed, it will be found that a substantially greater amplitude of power modulation will be effected by the chopping action of the reticle in the presence of the target 59 than in its absence. Thus, $f_s$ would be equal to $1/A$. This applies, of course, when the target image is substantially of the same dimension as the reticle aperture spacing, namely $A/2$.

*The Offset Reticle System*

In the above-mentioned system employing an "Offset" circular spoked reticle, it was described that the imaged field of view is focused on the reticle at a position between the axis of the reticle and the periphery of the reticle. This arrangement is depicted in FIG. 5 where the imaged field of view of FIG. 1 is shown by dotted line 52 to be positioned between an axis 67 and a periphery 68 of a reticle 69. The reticle 69 comprises a circularly shaped disc constructed to present alternate sector-like areas 70 and 71, having respectively different degrees of opacity to the energy being detected. By way of example, areas 71 are shown to be more opaque to the transmission of energy than the relatively transparent areas 70. If the reticle 69 is made of a sufficiently large radius relative to the diameter of the imaged field of view 52, the edges of reticle apertures 70 which cross the field of view will be nearly parallel therein. Therefore, if a spoked-disc reticle such as 69, adapted to be spun about its axis 67, is made large enough with respect to the imaged field of view 52 and the imaged field of view is positioned sufficiently near the periphery of the reticle, the reticle will have a space filtering effect substantially equivalent to the theoretical rectangularly apertured reticle 63 of FIG. 4.

The optical axis of the energy collection system forming the imaged field of view is indicated at 72 in FIG. 5. In such an arrangement, all of the reticle apertures which, at any instant, are embraced by the field of view 52 will be moving in substantially the same relative direction with respect to a line connecting the reticle axis 67 and the optical axis 72. This motion may be depicted vectorially by the vector arrow $V_R$. To the extent that the radii defining the reticle apertures diverge, the vector $V_R$ may be considered as representative of the average vector velocity of those reticle apertures embraced by the imaged field of view. The direction of reticle rotation about its axis 67 is, in turn, indicated by the arrow $V_A$. By way of example, arrows $v_s$ in FIG. 5 is indicative of one possible direction in which the field of view 52 may be scanned in space during the search phase of target surveillance. This will be discussed more fully hereinafter.

Offset Reticle Target Detection

The manner in which the offset system of FIG. 5 may be used for target detection during the search phase of target surveillance is shown diagrammatically in FIG. 6.

Here an optical collection apparatus 73, comprising a suitable arrangement of mirrors, lenses, etc., is provided for collecting energy from a given field of view 74. The collection apparatus 73 is adapted to image the field of view 74 at a focal plane 75 indicated by the dotted line connected arrows. In accordance with the off center reticle system being considered, the spoked reticle 69 is positioned at the focal plane 75 so that the field of view embraced by the collection apparatus 73 is imaged on the reticle 69. Spin-drive means 70' is provided for spinning or rotatably driving the reticle 69 about its axis 67. The reticle axis 67 is displaced from the optical axis 72 of the optical collection apparatus 73 so that the imaged field of view is, in its entirety, as illustrated in FIG. 5, positioned between the periphery of the reticle 69 and its axis 67. An integrating lens 77 is then provided for collecting all energy transmitted by the spinning reticle 69 and directing this energy to an energy sensitive cell 78. The cell 78 is responsive to energy incident thereon to produce an electrical signal at its output terminal 79, the magnitude of which is a function of the power intensity of the energy reaching the cell.

Thus, in the arrangement of FIG. 6, the reticle 69, driven by the spin-drive means 70', will cause the reticle apertures 71 (FIG. 5) to chop the energy represented in the imaged field of view in a manner substantially equivalent to the action described in connection with the reticle arrangement of FIG. 4.

At the output terminal 79 of the cell, there will then appear a direct current signal component the magnitude of which is representative of the average power transmitted by the reticle 69. However, the signal appearing at terminal 79 will also have an alternating current "carrier" component, the frequency of which is determined by the chopping action of the spinning reticle 69. This frequency, for fixed objects in a stationary field of view, will be directly governed by the angular velocity with which the spin drive means 70' causes the reticle 69 to spin about its axis. In order to filter out unnecessary harmonics from the alternating signal component appearing at terminal 79, a filter 80 is shown, the output of which is connected to an envelope detector 81.

For convenience, those elements of the off center reticle arrangement shown in FIG. 6 which fall within the dotted line rectangle 82 may be considered as a unitary detection assembly. The field of view 74 to which detection assembly 82 is responsive may be controllably positioned in space by a suitable mechanical drive system indicated by block 83. The drive system 83 is preferably of a character permitting the field of view 74 to be controllably positioned in both azimuth and elevation. Thus, by properly controlling the mechanical drive 83, the field of view 74 may be caused to scan a predetermined volume of space or "optical frame" in search of an object or target.

Searching for a Target

The search procedure illustrated more clearly in FIG. 7 where the field of view 74 is shown to be initially positioned, at a time $t_1$, is in the upper left-hand corner of a predetermined optical frame. For convenience in description, the leading edge of the field of view is at this position designated by the index $t_1$. This frame is indicated by the dotted line rectangle 84. By proper control of the mechanical drive 83 in FIG. 6, the field of view 74 in FIG. 7 may be made to systematically scan the frame 84. The manner in which this systematic scanning of the frame 84 is undertaken may follow various patterns. By way of example, in FIG. 7, the leading edge of the field of view 74 is, at time $t_1$, positioned as indicated and moved from left to right so that at time $t_{10}$ the field of view 74 is at the right-hand extremity of the frame 84. During the interval from the time $t_{10}$ to time $t_{12}$ the field of view is moved downwardly along a curved path P so that its leading edge is at the position shown at time $t_{12}$. Thereafter, the field of view moves from right to left to the position indicated at time $t_{22}$. This systematic pattern of scan, generally indicated by the dotted line 84' (with arrows $V_S$ thereon indicating the vectorial direction of scan velocity), is continued until the entire frame 84 has been examined. Purely by way of example, in the illustration of FIG. 7, the subject matter embraced by the field of view at time $t_{30}$ is shown to correspond to that indicated in FIG. 1. The horizon line 54 of FIG. 1 is, in FIG. 7, shown to a fuller extent, however, and can be seen to be of a length many times greater than that portion of it embraced by the field of view.

Figure 8:
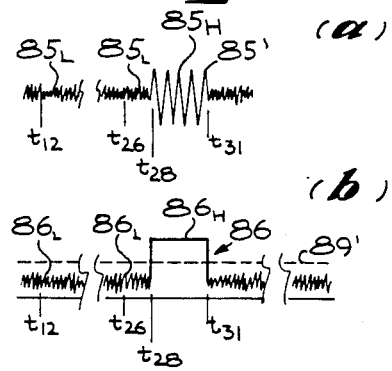
FIG. 8 is a graph of a group of waveforms characteristic of the output of apparatus shown in FIG. 6.

At some time, such as $t_{12}$, shown in FIG. 8, the position of the leading edge of the field of view will be coincident with the position indicated at $t_{12}$ in FIG. 7, and the field of view will be moving from right to left as indicated by the arrows $V_S$ on dotted line 84' adjacent this position. At this instant, it will be assumed that the aircraft 59, indicated in FIG. 1, will not have as yet been encountered by the moving field of view. The content of the field of view at that instant will, of course, be in the process of analysis by the rotating vehicle 69, and there will be some background content within the imaged field of view having a space frequency description causing a relatively low amplitude alternating current carrier signal (the fundamental of which corresponds to the chopping frequency of the chopping reticle) to appear at the output terminal 79 of cell 78 in FIG. 6. This is generally indicated by the low amplitude portion $85_L$ of the alternating current carrier signal depicted at 85 in FIG. 8(a). Still at a later time, $t_{26}$, the field of view will have been lowered somewhat and now moving from left to right, although not as yet having encountered the aircraft. The output of the cell will then be relatively low such as the previous level $85_L$.

However, as soon as the leading edge of the field of view encounters the aircraft 59 (such as at a time $t_{28}$), the amplitude of the carrier signal appearing at the output terminal 79, of cell 78, will increase, by a substantial amount, to an amplitude indicated in FIG. 8(a) at $85_H$. The amplitude of the carrier 85 rises to the value $85_H$ for reasons hereinabove set forth, namely—the reticle apertures have been so dimensioned as to re-enforce a space frequency at which substantial power is contributed by objects whose images have a size substantially corresponding to the imaged size of the aircraft being sought. It is under these conditions that the percentage modulation of the total energy passing through the reticle, by virtue of the chopping action of the moving reticle spokes on the target image, will be maximized.

This increase in the amplitude of the carrier produced by the cell will continue for a duration of time corresponding to the length of time that the target 59 remains within the moving field of view. This has been shown in FIG. 8 to be for a period of time $t_{28}$ to $t_{31}$, which period is termed the "dwell" period of the object or target within the moving field of view.

The envelope of the carrier modulation indicated in FIG. 8(a) is derived, as shown in FIG. 6, by means of the combined action of the filter 80 and envelope detector 81. At the output terminal $81_t$ of the detector 81 in FIG. 6, there will appear an alternating current signal of the character shown at 86 in FIG. 8(b). Here portion $86_L$ corresponds to the amplitude of the carrier $85_L$ in FIG.

8(a). Likewise, portion $86_H$ corresponds respectively to the carrier at amplitude $85_H$ in FIG. 8(a).

The Present Invention

Apparatus disclosed in FIG. 6 may be employed in the practice of the invention wherein the reticle 69 comprises simply a bronze wheel having spokes 71 and vacant spaces 70 between spokes to chop infrared, ultraviolet or visible light.

The manner in which a reticle is constructed in accordance with the invention is as follows. A first predetermined function must be developed mathematically equivalent to a function $F(x,y)$ in Cartesian coordinates $x$ and $y$, representing the total transparent area of a reticle lying in register with a focused beam of radiant energy and a sensitive cell. This function should be such that a function mathematically equivalent to the Fourier transform of $F(x,y)$ and equivalent to $$f(\omega_x,\omega_y)=\int_{y_1}^{y_2}\int_{x_1}^{x_2}F(x,y)e^{(\omega_x x+\omega_y y)}dxdy$$

is equal to zero, where $y_1, y_2, x_1$ and $x_2$, respectively, indicate the limits of integration to integrate effectively the total transparent area as defined above when the reticle is moved to cause one transparent area to pass completely through the portion of said imaged field of view intercepted both by the reticle and an associated cell; $\omega_x$ is the variation of radian frequency, $\omega$, in the $x$ direction; and $\omega_y$ is the variation of $\omega$ in the $y$ direction.

What is meant by "equivalent" is that a change of variables is also always possible. For example, a specific analysis follows which is a development of the space spectral distribution, or Fourier transform, of a circular field of view, when expressed in an off-center polar coordinate system.

Figure 9:
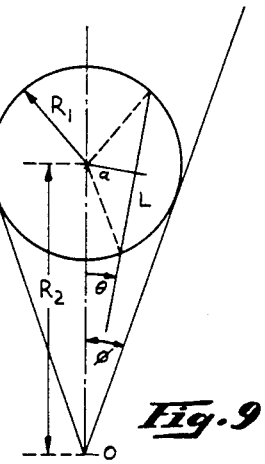
FIG. 9 is a diagrammatic view of a circular imaged field of view scanned by a single infinitely narrow transparent slit.

If an infinitely narrow slit, rotating around a center, at some time in its path crosses a circular field of view, the incremental area of the slit which is included within the field of view is proportional to the total amount of flux which the slit would pass when chopping a uniformly illuminated field. The incremental area included within the field of view is itself substantially proportional to the length L of the slit. This length, L, FIG. 9, equals $2\sqrt{R_1^2-a^2}$, or $2\sqrt{R_1^2-R_2^2\sin^2\theta}$, where $a^2=R_2^2\sin^2\theta$, $R_1$ is the radius of the field of view, $R_2$ is the distance from the center of the field to the center of the slit pattern, and $\theta$ represents the instantaneous angular position of the slit. The resultant aperture function taken about the center of the reticle is $$f(r,\theta)=2R_1R_2\cos\theta\sqrt{1-\frac{\sin^2\theta}{\sin^2\phi}} \quad (1)$$

where $\sin\phi=R_1/R_2$. The Fourier transform of this function is then $$C(\theta)=\int_{-\phi}^{+\phi}2R_1R_2\cos\theta\sqrt{1-\frac{\sin^2\theta}{\sin^2\phi}}e^{-j\omega\theta}d\theta \quad (2)$$

This function is an elliptic integral not readily transformable by ordinary methods. The integral is also a function of the radii $R_1$ and $R_2$, or the limit of integration. As the center of the reticle pattern approaches the field of view, $\phi$ increases. At $\phi=90°$, the center of the reticle is tangent to the field of view.

Figure 10:
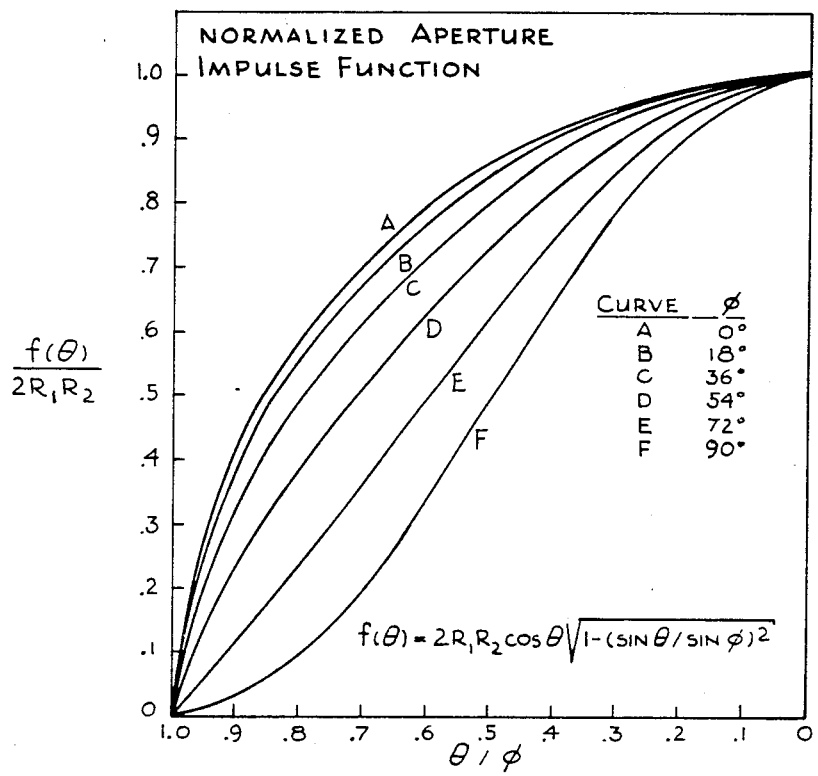
FIGS. 10, 11 and 12 are graphs of a group of functions employed in computing the Fourier transform of the illumination function of a slit passing over the imaged field of view shown in FIG. 9.
Figure 11:
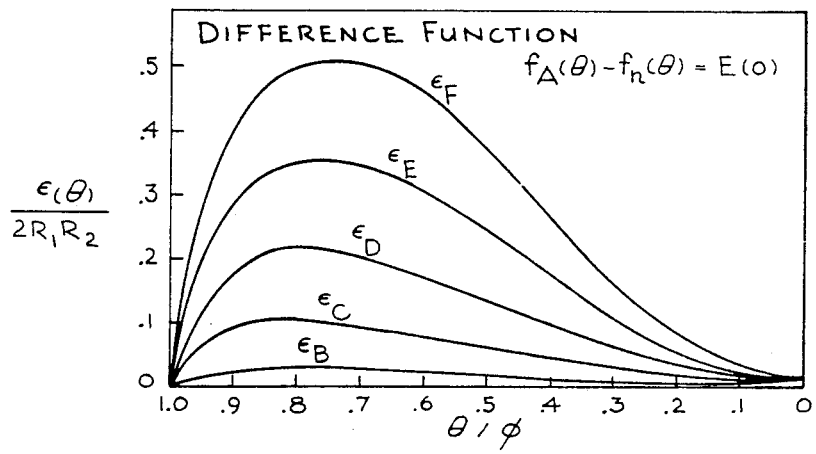

Although the function (2) is not readily transformable as it stands, the transform may be derived by breaking the function up into parts. A normalized amplitude function plotted against a normalized $\theta/\phi$ is illustrated in FIG. 10. The difference between the normalized curves is taken as a function of $\theta/\phi$ and is plotted in FIG. 11. These difference curves are all very similar in shape and with a proper multiplication each would form a very close fit to the original function. Since the extreme aperture function curves A and F are readily transformable, a correction to either of the curves may be made by applying a correction factor to the error function. This correction is valid because of superposition. The error function is simply $A-F$ or $\omega_A-\omega_F$. The original function (2) may thus be considered to consist of the circular function A, less some fraction of the difference function of $A-F$.

The Fourier transforms of the functions A and F can be found in any table of integrals. In the limit when $\phi$ approaches zero, the function A approaches a Bessel function.

$$f(\omega_A)=\int_{-\phi}^{+\phi}2R_1R_2\sqrt{1-\frac{\theta^2}{\phi^2}}e^{-j\omega\theta}d\theta \quad (3)$$

$$=2\pi R_1R_2\phi\frac{J_1(\omega\phi)}{\omega\phi} \quad (4)$$

When $\phi$ approaches $\pi/2$, the function F approaches a cosine function.

$$f(\omega_F)=\int_{-\pi/2}^{\pi/2}2R_1R_2\cos\theta\sqrt{1-\sin^2\theta}e^{-j\omega\theta}d\theta \quad (5)$$

$$=\int_{-\pi/2}^{\pi/2}2R_1R_2\frac{(\cos 2\theta+1)}{2}e^{-j\omega\theta}d\theta \quad (6)$$

$$=2R_1R_2\frac{\pi^2\sin\theta}{\omega_0(\pi^2-\omega_0^2)} \quad (7)$$

where $\omega_0=\omega\phi$.

Figure 12:
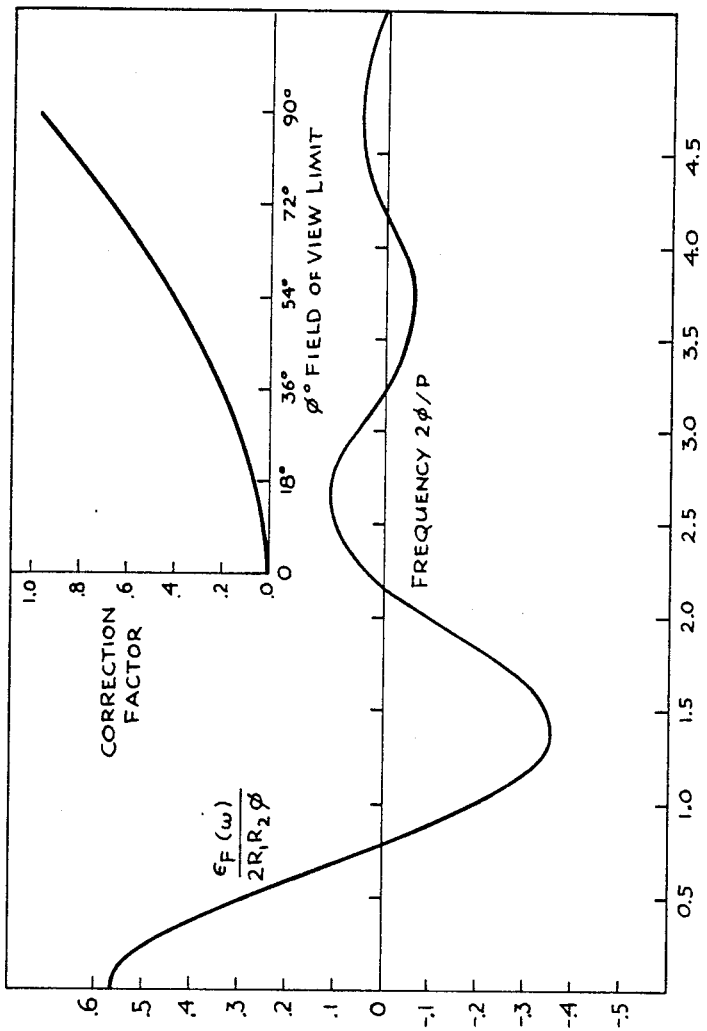
Figure 13:
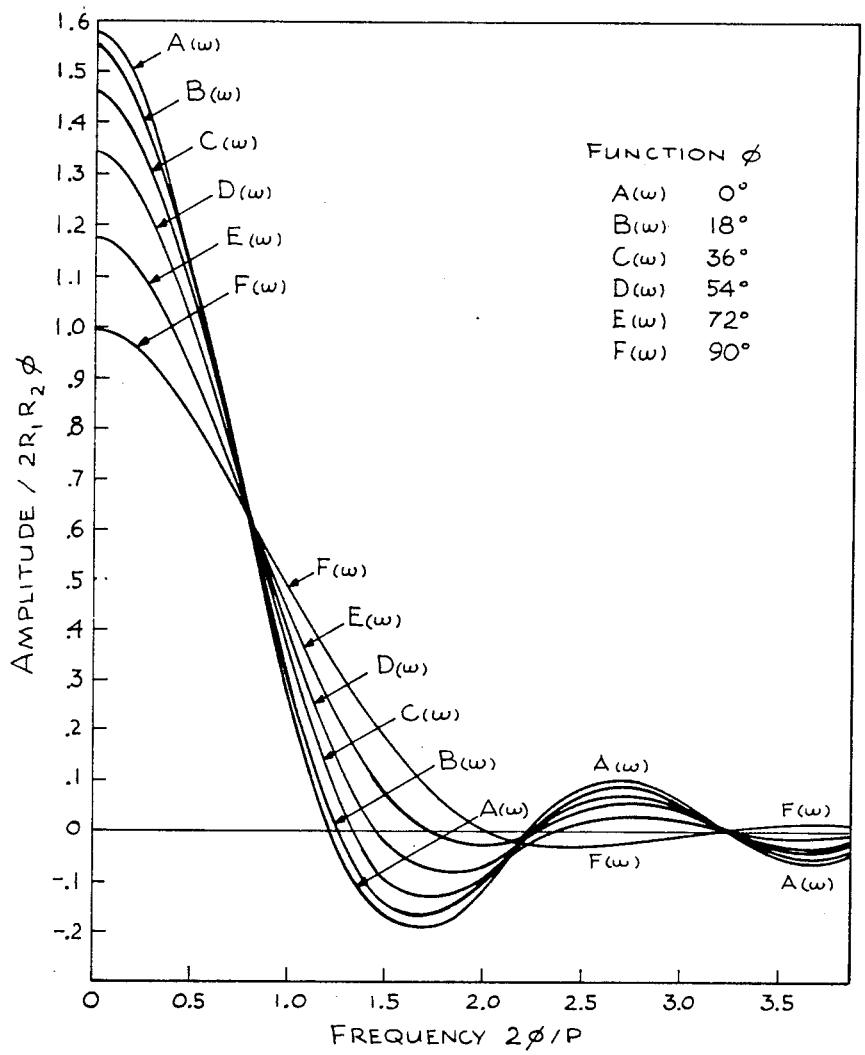
FIG. 13 is a graph of a group of transforms calculated from the curves of FIGS. 10, 11 and 12.

The difference between these two transforms, $$f(\omega_A)-f(\omega_F)$$

is illustrated in FIG. 12 together with the appropriate correction factor to apply to the Bessel function transform. The resultant normalized transform of the different aperture functions plotted against the reciprocal period of the aperture limits, $2\phi/p$, is shown in FIG. 13. If the reticle frequency is selected at one of the null frequencies, there will be no resultant output from a background of uniform intensity.

Thus far, the construction of the invention has been related to spacing of transparent areas. However, it is to be noted that the space transform of a particular total transmissivity function of reticle transparent areas passing into and out of an imaged field of view will be a function of several variables. These variables are transparent area shape, transparent area size, the path of transparent area movement, transparent area spacing, and imaged field of view shape and size. Of all these six parameters, perhaps the two most easily established are the path of transparent area movement and imaged field of view size. In the first place, quite conventionally an iris to act as a field stop is often incorporated in a radiant energy collection apparatus. Still further, with an offset spoke-type reticle which may be of the same general type indicated diagrammatically in FIG. 9, the distance $R_2$ may be easily adjusted. For these reasons, although the invention is by no means limited to this method of construction of the invention, it may be most convenient to construct a reticle of a particular transparent area spacing, size and shape based upon the expected blur circle size and speed at which it is desired that it be rotated. Still further, the path of transparent area movement in passing through an imaged field of view may also be established, for example, as that indicated in FIG. 9. However, the actual distance $R_2$ need not be. In other words, the space transform can be plotted as a normalized function of the distance $R_2$. Still further, the space transform of a transparent area passing through the circular registration area shown in FIG. 9 of radius $R_1$ may also be plotted as a normalized function of the radius $R_1$. However, by virtue of the assumption of a circular registration area, at least its shape may be assumed for a particular case. If it is desired only to plot the space transform as a normalized function of only one of the $R_1$ or $R_2$ parameters, one of them, of course, will be assumed. At any rate, it will be noted that reticle transparent area size and spacing will generally be determined by factors other than that required for producing zero fundamental aperture modulation. Other parameters to fit the transparent area spacing thus will then be established to prevent aperture modulation at least at the fundamental chopping frequency of a reticle. One of the reasons for establishing disc-shaped spoke-type reticle transparent area spacing first is that, obviously, all transparent areas and all opaque areas are preferably made the same size and shape and an integral number of each are provided. For this reason, other parameters may more conveniently be established later to produce a space transform null at the fundamental reticle chopping frequency.

Figure 14:
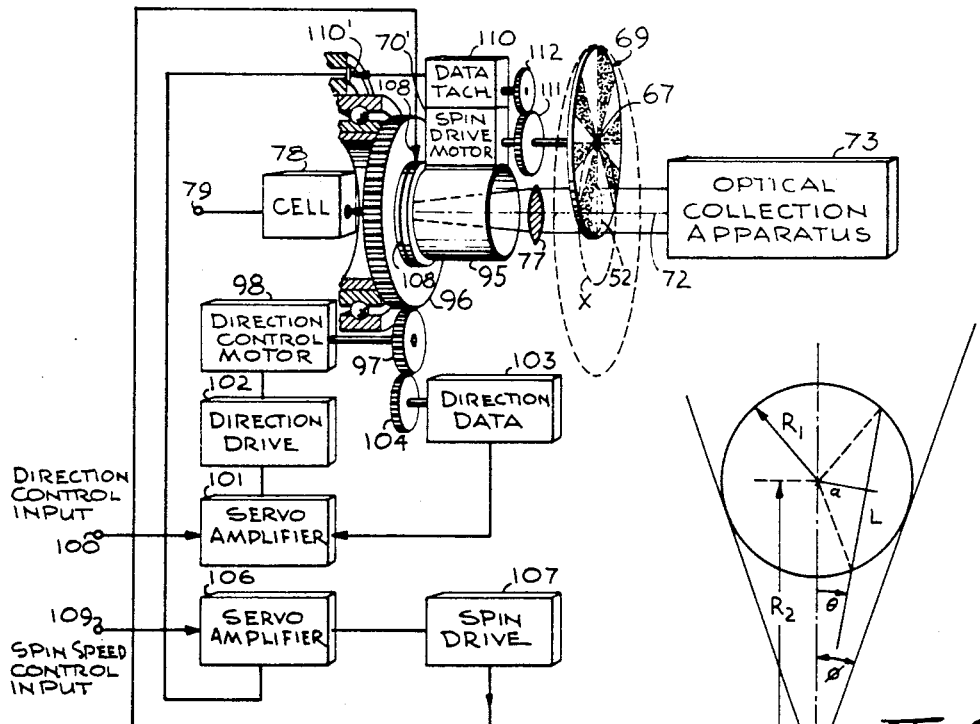
FIG. 14 is a combination block and diagrammatic representation of novel apparatus and control system arrangements useful in the practice of the present invention.

By way of example, a preferred form of the present invention is diagrammatically illustrated in FIG. 14. Basically, the arrangement shown in FIG. 14 is substantially the same as that shown in FIG. 6, and to the extent of the similarity, like elements have been given the same reference numbers in both figures. As in the arrangement of FIG. 6, an optical collection apparatus 73 having an optical axis 72 images a field of view upon the reticle 69, the imaged field of view being indicated at 52. As in the arrangement of FIG. 6, an integrating lens element 77 collects energy transmitted by the reticle 69 and directs this energy to a sensitive cell 78. The output terminal of the cell is designated at 79. The reticle 69 is adapted to be spun about its axis 67 by means of a spin drive motor 70'.

However, in FIG. 14, in accordance with the present invention, the spin drive motor 70', whose shaft is connected to the axis of reticle 69, is adapted to be driven in a circular path around the optical axis 72. To this end, the spin drive motor 70' is mounted on a tubular member 95 to which is attached a drive gear 96. An actuating gear 97, attached to the shaft of a direction control motor 98, engages the drive gear 96 so as to permit the spin drive motor 70' and, hence the axis 67 of the reticle, to be positioned at any point along the dotted line path X. The position of the reticle axis 67 around path X controls the vector direction of reticle aperture movement with respect to a reference line in space and, thus, provides means for controlling the vector direction of reticle aperture motion with respect to the scan velocity vector describing the movement of the field of view during the search phase of target surveillance. The position of the reticle axis 67 may be servo controlled in accordance with direction input signal information applied to the input terminal 100 of a servo amplifier 101. The output of the servo amplifier 101 controls the power delivered to the motor 98 through a direction drive 102. Direction feed back information, necessary for the servo control of the reticle aperture direction, is derived from a direction data means 103 mechanically coupled by means of the gear 104 to the actuating gear 97. Thus, by varying the input potential to the direction input terminal 100, the position of the reticle axis 67 may be conrollably fixed at any desired point along path X.

The angular velocity with which the reticle 69 is spun about its axis 67 may be also controlled by means of a servo amplifier 106 which acts through the spin drive 107 to control the speed of spin drive motor 70'. Output of the spin drive 107 is coupled to the spin drive motor 70' through a slip ring and brush asesmbly, whose components are generally indicated by the reference numeral 108. A control signal for establishing the speed of reticle rotation at any given value can then be applied to the input terminal 109 of the servo amplifier 106. Reticle speed data, for feed back to the servo amplifier, is provided from a data tachometer 110 coupled to the spin drive motor 70' by means of gears 111 and 112.

What is claimed is:

1. In an optical system including radiant energy collection apparatus having a field of view, said collection apparatus being adapted to image said field of view at a predetermined focal plane, a reticle comprising: a body having a cross-sectional construction presenting a plurality of areas relatively opaque to radiant energy defining a plurality of other areas relatively transparent to radiant energy; and drive means for moving said reticle in a manner such that portions thereof intercept and pass completely through said imaged field of view periodically, whereby no portion of said reticle lies in said imaged field of view during any complete cycle of movement of said reticle, the size, shape and direction of movement of said reticle transparent areas, and the size and shape of said imaged field of view being such that the spacing of said transparent areas is substantially equal to the reciprocal of the corresponding space frequency at one null of the Fourier transform of the total area within both a reticle transparent area and said imaged field of view; and energy sensitive means positioned to receive energy transmitted through said reticle transparent areas for producing an electrical signal in response to variations in the energy received, the reticle cross-sectional construction being such that said electrical signal is minimal in response to a uniformly bright field of view.

2. In an optical system, the combination comprising: radiant energy collection apparatus having a field of view, said collection apparatus being adapted to image said field of view at a predetermined focal plane; a reticle comprising a body having a cross-sectional construction presenting a plurality of areas relatively opaque to radiant energy defining a plurality of other areas relatively transparent to radiant energy; drive means for moving said reticle in a manner such that portions thereof intercept and pass completely through said imaged field of view periodically, whereby no portion of said reticle lies in said imaged field of view during any complete cycle of movement of said reticle, the size, shape and direction of movement of said reticle transparent areas, and the size and shape of said imaged field of view being such that the spacing of said transparent areas defined by said body is substantially equal to the reciprocal of the corresponding space frequency at one null of the Fourier transform of the total transparent area within both a reticle transparent area and said imaged field of view; and a radiant energy sensitive cell positioned to receive energy transmitted through said reticle transparent areas for producing an electrical signal in response to variations in the energy received, the reticle cross-sectional construction being such that said electrical signal is minimal in response to a uniformly bright field of view.

3. In an optical system including radiant energy collection apparatus having a field of view, said collection apparatus being adapted to image said field of view at a predetermined focal plane, said collection apparatus having an optical axis, and a radiant energy sensitive cell on said optical axis, the combination comprising: a reticle having a cross-sectional construction presenting a plurality of alternate adjacent areas relatively opaque and transparent to radiant energy, all of said transparent areas being substantially identical in shape and size; and drive means for moving said reticle in a manner such that portions thereof intercept and pass completely through said imaged field of view periodically, whereby no portion of said reticle lies in said imaged field of view during any complete cycle of movement of said reticle, the size, shape and direction of movement of said reticle transparent areas, and the size and shape of said imaged field of view being such that the spacing of said transparent areas is substantially equal to the reciprocal of the corresponding space frequency at one null of the Fourier transform of the total transparent area within both a reticle transparent area and said imaged field of view, said radiant energy sensitive cell being positioned to receive energy transmitted through said reticle transparent areas for producing an electrical signal in response to variations in the energy received, the reticle cross-sectional construction being such that said electrical signal is minimal in response to a uniformly bright field of view.

4. In an optical system including radiant energy collection apparatus having a field of view, said collection apparatus being adapted to image said field of view at a predetermined focal plane, said collection apparatus having an optical axis and a radiant energy sensitive cell on said optical axis, the combination comprising: a reticle having a cross-sectional construction presenting alternate adjacent areas relatively opaque and transparent to radiant energy; and drive means for moving said reticle in a manner such that portions thereof intercept and pass completely through said imaged field of view periodically, whereby no portion of said reticle lies in said imaged field of view during any complete cycle of movement of said reticle, said transparent areas having a size, shape spacing and direction of movement as compared to the size and shape of said imaged field of view, such that the amplitude of at least the fundamental space frequency component of the total transparent area within both a reticle transparent area and said imaged field of view is substantially equal to zero, said radiant energy sensitive cell being positioned to receive energy transmitted through said reticle transparent areas for producing an electrical signal in response to variations in the energy received, the reticle cross-sectional construction being such that said electrical signal is minimal in response to a uniformly bright field of view.

5. In an optical system, the combination comprising: radiant energy collection apparatus having a field of view, said collection apparatus being adapted to image said field of view at a predetermined focal plane, a reticle having a cross-sectional construction presenting alternate adjacent areas relatively opaque and transparent to radiant energy, drive means for moving said reticle in a manner such that portions thereof intercept and pass completely through said imaged field of view periodically, whereby no portion of said reticle lies in said imaged field of view during any complete cycle of movement of said reticle, said opaque and transparent areas having a size, shape and direction of movement as compared to the size and shape of said imaged field of view, such that the amplitude of at least the fundamental space frequency component of the total transparent area within both a transparent area and said imaged field of view is substantially equal to zero; and a radiant energy sensitive cell positioned to receive energy transmitted through said transparent areas for producing an electrical signal in response to variations in the energy received, the reticle cross-sectional construction being such that said electrical signal is minimal in response to a uniformly bright field of view.

6. In an optical system including radiant energy collection apparatus having a field of view, said collection apparatus being adapted to image said field of view at a predetermined focal plane, the combination comprising: a reticle having a cross-sectional construction presenting a plurality of areas relatively opaque to radiant energy defining therebetween a plurality of other areas relatively transparent to radiant energy; and drive means for moving said reticle in a manner such that portions thereof intercept and pass completely through said imaged field of view periodically, whereby no portion of said reticle lies in said imaged field of view during any complete cycle of movement of said reticle, the size, shape and direction of movement of said reticle transparent areas, and the size and shape of said imaged field of view being such that the spacing of said transparent areas is substantially equal to the reciprocal of the corresponding space frequency at one null of the Fourier transform of the total transparent area common to both a reticle transparent area and said imaged field of view, said corresponding space frequency being higher than that at the first null of said Fourier transform; and energy sensitive means positioned to receive energy transmitted through said reticle transparent areas for producing an electrical signal in response to variations in the energy received, the reticle cross-sectional construction being such that said electrical signal is minimal in response to a uniformly bright field of view.

7. In an optical system including radiant energy collection apparatus having a field of view, said collection apparatus being adapted to image said field of view at a predetermined focal plane, the combination comprising: a reticle having a cross-sectional construction presenting a plurality of areas relatively opaque to radiant energy defining therebetween a plurality of other areas relatively transparent to radiant energy; and drive means for moving said reticle in a manner such that portions thereof intercept and pass completely through said imaged field of view periodically, whereby no portion of said reticle lies in said imaged field of view during any complete cycle of movement of said reticle, the spacing of said transparent areas being such that the radiant energy passed therethrough when the imaged field of view is uniformly illuminated is substantially constant; and energy sensitive means positioned to receive energy transmitted through said reticle transparent areas for producing an electrical signal in response to variations in the energy received, the reticle cross-sectional construction being such that said electrical signal is minimal in response to a uniformly bright field of view.

8. An optical system comprising: radiant energy collection apparatus having a field of view, said collection apparatus being adapted to image said field of view at a predetermined focal plane; a reticle having a cross-sectional construction presenting a plurality of substantially identical elongated areas relatively opaque to radiant energy defining therebetween a plurality of other substantially identical elongated areas relatively transparent to radiant energy, both said relatively opaque and relatively transparent areas also being substantially identical, and drive means for moving said reticle in a manner such that portions thereof intercept and pass completely through said imaged field of view periodically in a direction approximately perpendicular to the lengths of said areas, whereby no portion of said reticle lies in said imaged field of view during any complete cycle of movement of said reticle, the relationship of the size and shape of said imaged field of view, the size, shape and spacing of said relatively transparent areas, and the path of transparent area movement being such that transparent area spacing is substantially equal to the reciprocal of a corresponding space frequency at one null of the Fourier transform of the total transparent area common to both a reticle transparent area and said imaged field of view; and energy sensitive means positioned to receive energy transmitted through said reticle transparent areas for producing an electrical signal in response to variations in the energy received, the reticle cross-sectional construction being such that said electrical signal is minimal in response to a uniformly bright field of view.

9. An optical system comprising: radiant energy collection apparatus having a field of view, said collection apparatus being adapted to image said field of view at a predetermined focal plane; a reticle having a cross-sectional construction presenting a plurality of substantially identical elongated areas relatively opaque to radiant energy defining therebetween a plurality of other substantially identical elongated areas relatively transparent to radiant energy, both said relatively opaque and relatively transparent areas also being substantially identical; and drive means for moving said reticle in a manner such that portions thereof intercept and pass completely through said imaged field of view periodically in a direction approximately perpendicular to the lengths of said areas, whereby no portion of said reticle lies in said imaged field of view during any complete cycle of movement of said reticle, the relationship of the size and shape of said imaged field of view, the size, shape and spacing of said relatively transparent areas, and the path of transparent area movement being such that the radiant energy passed through said transparent areas when the imaged field of view is uniformly illuminated is substantially constant; and energy sensitive means positioned to receive energy transmitted through said reticle transparent areas for producing an electrical signal in response to variations in the energy received, the reticle cross-sectional construction being such that said electrical signal is minimal in response to a uniformly bright field of view.

References Cited in the file of this patent

UNITED STATES PATENTS

| | | |
|---|---|---|
| 2,878,396 | Behm et al. | Mar. 17, 1959 |
| 2,905,828 | O'Malley et al. | Sept. 22, 1959 |
| 2,931,911 | Nichols | Apr. 5, 1960 |
| 2,942,118 | Gedance | June 21, 1960 |
| 3,002,098 | Watkins | Sept. 26, 1961 |

UNITED STATES PATENT OFFICE

CERTIFICATE OF CORRECTION

Patent No. 3,138,712                                               June 23, 1964

George F. Aroyan

It is hereby certified that error appears in the above numbered patent requiring correction and that the said Letters Patent should read as corrected below.

Column 2, line 69, for "outpu-signal" read -- output-signal --; column 4, line 38, for "modultaion" read -- modulation --; column 11, lines 19 to 21, for that portion of the formula reading $$\int_{y_1}^{y_1} \int_{x_1}^{y_2} \quad \text{read} \quad \int_{y_1}^{y_2} \int_{x_1}^{x_2}$$

Signed and sealed this 15th day of August 1967.

(SEAL)
Attest:

EDWARD M. FLETCHER, JR.                                    EDWARD J. BRENNER
Attesting Officer                                                Commissioner of Patents